(12) United States Patent
Alten

(10) Patent No.: US 8,813,247 B1
(45) Date of Patent: Aug. 19, 2014

(54) PROVIDING CRYPTOGRAPHIC SECURITY FOR OBJECTIVE-ORIENTED PROGRAMMING FILES

(76) Inventor: Alex I. Alten, Pleasanton, CA (US)

( * ) Notice: Subject to any disclaimer, the term of this patent is extended or adjusted under 35 U.S.C. 154(b) by 1114 days.

(21) Appl. No.: 12/419,793

(22) Filed: Apr. 7, 2009

Related U.S. Application Data

(60) Provisional application No. 61/043,029, filed on Apr. 7, 2008.

(51) Int. Cl.
| | |
|---|---|
| G06F 7/04 | (2006.01) |
| G06F 15/16 | (2006.01) |
| G06F 17/30 | (2006.01) |
| G06F 11/30 | (2006.01) |
| G06F 12/14 | (2006.01) |
| H04L 29/06 | (2006.01) |
| H04L 9/00 | (2006.01) |
| H04N 7/16 | (2011.01) |

(52) U.S. Cl.
USPC ............... 726/28; 726/4; 713/193; 380/45

(58) Field of Classification Search
USPC ........... 707/687, 690, 697–698, 705, 757, 707/781–788; 713/189, 193, 166–167, 182; 726/26–30, 1–7; 380/28–30, 277–286, 380/44–47
See application file for complete search history.

(56) References Cited

U.S. PATENT DOCUMENTS

| | | | |
|---|---|---|---|
| 6,298,354 B1 * | 10/2001 | Saulpaugh et al. ................ 1/1 |
| 7,093,137 B1 * | 8/2006 | Sato et al. ................... 713/193 |
| 7,362,868 B2 * | 4/2008 | Madoukh et al. ............. 380/277 |
| 2002/0143800 A1 * | 10/2002 | Lindberg et al. ............ 707/201 |
| 2005/0283620 A1 * | 12/2005 | Khulusi et al. ............... 713/185 |
| 2006/0095791 A1 * | 5/2006 | Wong ............................ 713/189 |
| 2008/0077475 A1 * | 3/2008 | McElhiney et al. ............ 705/10 |
| 2008/0082834 A1 * | 4/2008 | Mattsson ...................... 713/189 |

* cited by examiner

*Primary Examiner* — Kambiz Zand
*Assistant Examiner* — Trong Nguyen
(74) *Attorney, Agent, or Firm* — James M. Wu; JW Law Group

(57) ABSTRACT

An apparatus and method for providing an Internet Web services for securing the transmission of data between object oriented software infrastructure and relational database via web pages are disclosed. Upon generating a table having multiple columns for encrypting a database, a process is capable of handling object attributes in accordance with the table. The process, in one embodiment, encrypts HTML data elements at a browser level.

20 Claims, 16 Drawing Sheets

```
400 → int getKEK(unsigned char *pKEK)
      { // imagine local variable declarations here...
        sck = socket(AF_INET, SOCK_DGRAM, 0);
        ioctl(sck, SIOCGIFCONF, &ifc); // query interfaces
        ifr = ifc.ifc_req; nInterfaces = ifc.ifc_len / sizeof(struct ifreq);
        for (i=0; i<nInterfaces; i++) {
          struct ifreq *item = &ifr[i]; ioctl(sck, SIOCGIFHWADDR, item);
          if (strcmp("eth0", item->ifr_name)==0)
          { // Run Ethernet address through digest
            EVP_DigestInit(&md_ctx, EVP_sha1());
            EVP_DigestUpdate(&md_ctx, (const void *) item->ifr_hwaddr.sa_data, (size_t) 6);  ← 402
            EVP_DigestFinal(&md_ctx, digest, NULL);
                                            406
            for (q=0;q<sizeof(digest);q++)  410
              digest[q] = digest[q] ^ mask[q]; // mask is random static bits
   412 — memcpy(pKEK, digest, sizeof(digest));
            close(sck); return 0; // exit OK
          } // end of if "eth0" check
        } // end of for loop
        close(sck); return 1;
      };
```

Figure 4

```
500 → int main(int argc, char **argv)
      { // imagine local variable declarations here....
502 → getKEK(KEK); fd = open(argv[1], O_RDWR);
504 → getSplitMEK(splitMEK1);
506 → sleep(5);
508 → getSplitMEK(splitMEK2);
      for (q=0;q<sizeof(MEK);q++)
510 →    MEK[q] = splitMEK1[q] ^ splitMEK2[q];
      for (q=0;q<sizeof(MEK);q++)
512 →    EncMEK[q] = MEK[q] ^ KEK[q];
      length = sizeof(buffer); memset(buffer, 0, length);
514 → length2 = read(fd, (void *) buffer, length);
      for (q=0;q<(length2-32);q++) // look for 32 byte pattern
         if (foundPattern(&buffer[q], pattern)
            break; // found buffer location
      offset = lseek(fd, (off_t) q, SEEK_SET);
516 → length3 = write(fd, (const void *) EncMEK, (size_t) 32);
      close(fd); exit(0);
      }
```

Figure 5

```
#include "ruby.h"
#include "evp.h"
600 ──▶ void Init_CarCrypto()
        {
602 ──▶     mCarCrypto = rb_define_module("CarCrypto");

604 ──▶     rb_define_module_function(mCarCrypto, "generateBlackDataKey",
                mCarCrypto_generateBlackDataKey, 0); // used to secure dbase columns 606 ──▶     rb_define_module_function(mCarCrypto, "retrieveRedDataKey",
                mCarCrypto_retrieveRedDataKey, 0); // used to secure dbase columns 608 ──▶     rb_define_module_function(mCarCrypto, "generateBlackAuthKey",
                mCarCrypto_generateBlackAuthKey, 1); // used during user enrollment 610 ──▶     rb_define_module_function(mCarCrypto, "dataEncrypt",
                mCarCrypto_dataEncrypt, 3);

612 ──▶     rb_define_module_function(mCarCrypto, "dataDecrypt",
                mCarCrypto_dataDecrypt, 3);
        }
```

Figure 6

```
700 → class CarCrypto
704 →    def generateBlackDataKey ... end
706 →    def retrieveRedDataKey(black_data_key) ... end
708 →    def generateBlackAuthKey(password) ... end
710 →    def dataEncrypt(black_key, cleartext_object, iv) ... end
712 →    def dataDecrypt(black_key, ciphertext_object, iv) ... end
         end
```

Figure 7

```
802 → static unsigned char encMEK[32];
800 → static VALUE mCarCrypto_encryptData(VALUE self, VALUE data1, VALUE data2,
       VALUE data3)
{
    string2binary(black_key, RSTRING(data1)->ptr, RSTRING(data1)->len);
    string2binary(clear_text, RSTRING(data2)->ptr, RSTRING(data2)->len);
    string2binary(iv, RSTRING(data3)->ptr, RSTRING(data3)->len);
    getKEK(KEK);
                                          804
    for (q=0;q<sizeof(MEK);q++)
806 →   data_key[q] = black_key[q] ^ encMEK[q] ^ KEK[q];
                                          802
    inlen = atoi(RSTRING(data2)->len);
    EVP_EncryptInit(&cipher_ctx, EVP_aes_128_ctr(), data_key, 0);// Counter mode
808 → EVP_EncryptUpdate(&cipher_ctx, cipher_ctx, cipher_text, &outlen, clear_text, inlen);
810 → EVP_EncryptFinal(&cipher_ctx, cipher_text + outlen, &tmplen);
    binary2string(strCipherText, cipher_text, tmplen);
    return rb_str_new2(strCipherText);
};
```

ActiveRecord Class Hierarchy    1200

```
1202  class Car < ActiveRecord::Base
          @wheels = 4
      end
1204  class ModelT < Car
          @color="black"
      end
1206  class CarKey < ActiveRecord::Base
      end
```

1208

```
CREATE TABLE ' cars'(
    'id'    int(8) NOT NULL auto_increment
    ' wheels'   int (4) unsigned default 4,
    ' color'  int(32) unsigned default ' black',
    PRIMARY KEY'( id )' );
```

1210

```
CREATE TABLE 'car_keys' (
    'id' int(8) not null autoincrement,
    'column_name' varchar(255),
    'label_id' bigint(16) unsigned zerofill,
    'black_key' bigint(16) unsigned zerofill,
    'level' int(4) unsigned zerofill,
    PRIMARY KEY ('id') );
```

Figure 12

```
1300  class ReferenceMonitor
1302    def enroll_user   (agent_id, user_name, password, capabilities)end
            Adds new user to capabilities table
            Returns user id and black auth key (encrypted w/usepassword)
1304    def revoke_user (agent_id, user_id).. end
            Revokes user in capabilities table (sets revoked variable =)true
            Returns user or nil
1306    def authenticate_user(user_id,auth_key , credential).. end
            Returns user or nil
1308    def create_label (user_id, level).. end
            Returns data label with new black data key inside or nil
1310    def break_label (user_id, data_label).. end
            Returns red data key or nil
       end
```

User Security Attributes
1402 class UserCapability < ActiveRecord::Base
end

Data Security Label Attributes
1404 class DataLabel < ActiveRecord::Base
end

1406

CREATE TABLE 'user_capabilities' (
    'id' int(8) not null autoincrement,
    'black_auth_key' bigint(16)
        unsigned zerofill,
    'name' varchar(32),
    'level' int (4) unsigned zerofill,
    'revoked' bool default false,
    PRIMARY KEY ('id') );

1408

CREATE TABLE 'data_labels' (
    'id' int(8) not null autoincrement,
    'black_key' bigint(16) unsigned
        zerofill,
    'level' int (4) unsigned zerofill,
    PRIMARY KEY ('id') );

Figure 14

```
1500  def authenticate_user(user_id, credential)
   1502  user = UserCapability.find user_id
   1504  if (user.revoked==true)
            return nil
   1506  str_id = CarCrypto.dataDecrypt  user.black_key.to_s  credential.to_s
   1508  if (user.id != str_id.to_i)
            return nil
   1510  return user
      end
```

Figure 15

```
1600    def create_label(user_id, data_level, credential)
    1602    if (authenticate_user(user_id, credential)==false)
                return nil
    1604    user = Capability.find user_id
    1606    if (user.level <= data_level)
        1608    data_label = DataLabel.new
        1610    str_black_key = CarCrypto.generateBlackDataKey
        1612    data_label.black_key = str_black_key.to_i
        1614    data_label.level = data_level
        1616    return data_label
            end
            return nil
        end
```

Figure 16

```
1700  def break_label(user_id, data_label, credential)
   1702   if (authenticate_user(user_id, credential)==false)
              return nil
   1704   user = Capability.find user_id
   1706   if (user.level >= data_label.level)
       1708   return data_label.black_key
          end
          return nil
       end
```

Figure 17

- app/models/car.rb  1800

```
1801 class Car < ActiveRecord::Base
   1806 cattr_accessor :Car_initialized
   1808 has_many :car_keys 1802 def after_initialize
      1810  o = CarKeys.find_by_column_name "wheels"
      1812  black_key = breakLabel @curr_user.id o.data_label @curr_user.credential
      1814  strWheels = CarCrypto.dataDecrypt black_data_key.to_s self.wheels.to_s self.id
      1816  self.wheels = strWheels.to_i # cleartext
         end 1804 def before_save
      1818  o = CarKeys.find_by_column_name "wheels"
      1820  black_key = breakLabel @curr_user.id o.data_label @curr_user.credential
      1822  strWheels = CarCrypto.dataEncrypt o.black_key.to_s self.wheels.to_s self.id
      1824  self.wheels = strWheels.to_i # ciphertext
         end
      end
```

Figure 18

```
1900  •  apps/controllers/car_controller.rb 1901  before_filter :check_authentication
1902  def check_authentication
          unless session[:user]
              redirect_to :action => "Login"
          end
    1916  @current_user = UserCapability.find_by_id(session[:user_id])
      end 1920  class carController < ApplicationController::Base
      1922  def index
          1924  car_obj = Car.find(:first, :order => 'RAND()')
          1926  black_key = @current_user.black_auth_key
          1928  strWheels = CarCrypto.dataEncrypt black_key car_obj.wheels 0
          1930  car_obj.wheels = strWheels.to_i   # ciphertext
          end
      end
```

Figure 19

```
2000  •  app/views/car/index.rhtml

2002  <script type="text/javascript" src=" jscrypt.js"/>

2004    <h1>Car identifier<%= car_obj.id%> </h1>
        <script>
  2006    var _ black_auth_key= getStoredAuthKey();
  2008    var _password =getPassword();
  2010    var _ password_kek  = generateDigestMD5(_password);
  2012    var _red_auth_key = aesDecrypt(_black_auth_key, password_kek,"ECB");
  2014    var _ encwheels = <%= car_obj.wheels%>
  2016    var _wheels = aesDecrypt(_encwheels, _red_auth_key,"CTR", 0);
  2018       document.write( <p>It has" + _wheels +" wheels.</p>");
        </script>
```

Figure 20

PROVIDING CRYPTOGRAPHIC SECURITY FOR OBJECTIVE-ORIENTED PROGRAMMING FILES

CROSS-REFERENCE TO RELATED APPLICATION

This application claims the priority of an earlier filed U.S. provisional application Ser. No. 61/043,029, entitled "Providing Cryptographic Security for Object-Oriented Programming Files," filed on Apr. 7, 2008.

FIELD

The exemplary embodiment(s) of the present invention relates to Internet Web Services in general, and in particular securing the transmission of data from a Web Page across an Object Oriented software infrastructure and to a Relational Database, and vice versa.

BACKGROUND

The current best practices for securing large scale Web Services on Internet connected computer systems rely on layered computer network defenses based on firewalls, IDS/IPS appliances, network flow guards, PKI certificates and VPN technologies. These are costly to procure, deploy and maintain, and require a significant amount of physical and personnel security to mitigate their shortcomings. Furthermore they do not easily facilitate the ability to share information.

Most organizations today use an amalgam of security technologies and methods to secure their internal networks, allowing remote access to the network and communication with partner organizations. Typically their network layout is a set of internal LANs fronted by a DMZ LAN that then connects to the Internet or to communications links with a partner organization through firewalls and VPNs. This is known as a "castle moat" style of network security. With the advent of ubiquitous radio-based networking and a greater desire to share internal information with outsiders, such as customers and partners via Internet communications and Web Services, a new model is needed, called an "airport" style of network security. Information technology access control must now be done at the granularity of individual users and information.

SUMMARY

Today many organizations are struggling with how to handle the impact of Internet technologies on their internal networks, external communications with partners, and public (or partner) access to internal resources such as databases. The old security techniques of physical isolation and firewalls, the "castle moat" approach is being replaced by a transformational, net centric and data-centric model, which requires what is being called an "airport" style of security. The problem is boiling down to how we can build dependable distributed systems, operating across a diverse set of networks (especially wireless). The answer is to stitch together a seamless integration of security protocols, authentication techniques, access control methods, cryptographic technology, multilevel and multilateral (cross-domain) security policies, monitoring systems, physical tamper resistance, network defense, and personnel management. Many of these are mature and well-known security technologies or methods, and they have been used as components of many security system designs for governmental, military, financial, and commercial organizations over the years. The security system shown in this invention is high-performance, scalable, and cost effective. It will rely on modern cryptography as the key enabling technology for protecting web services systems; allowing the complexity of transmitting trust, from where it is located to where it is needed, while remaining hidden from application programmers and users in order to isolate them from the intricacies of proper data at rest and in transit encryption.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 4 depicts a diagram illustrating one embodiment of generating a Key Encryption Key (KEK).

FIG. 5 depicts a diagram illustrating one embodiment of generating a Master Encryption Key (MEK).

FIG. 6 depicts a diagram illustrating one embodiment of a cryptographic library interface with an embedded MEK.

FIG. 7 depicts a diagram illustrating one embodiment of an Object Oriented cryptographic class with an embedded MEK.

FIG. 8 depicts a diagram illustrating one embodiment of a function for an Object Oriented cryptographic class method.

FIG. 11 depicts a diagram illustrating one embodiment of database record to object decryption.

FIG. 12 depicts a diagram illustrating one embodiment of supporting an encrypted STI paradigm for a ciphertext database table to clear text object hierarchy.

FIG. 13 depicts a diagram illustrating one embodiment of a Reference Monitor object-oriented class.

FIG. 14 depicts a diagram illustrating one embodiment of user and data security attribute classes.

FIG. 15 depicts a diagram illustrating one embodiment of a user authentication method.

FIG. 16 depicts a diagram illustrating one embodiment of creating a Security Data Label.

FIG. 17 depicts a diagram illustrating one embodiment of breaking a Security Data Label.

FIG. 18 depicts a diagram illustrating one embodiment of a Model automatically encrypting or decrypting records to and from a database table.

FIG. 19 depicts a diagram illustrating one embodiment of a Controller checking user credentials and encrypting object data for an HTML page for a user.

FIG. 20 depicts a diagram illustrating one embodiment of a View checking user credentials and decrypting object data inside an HTML page for a user.

DETAILED DESCRIPTION

Figure 1:
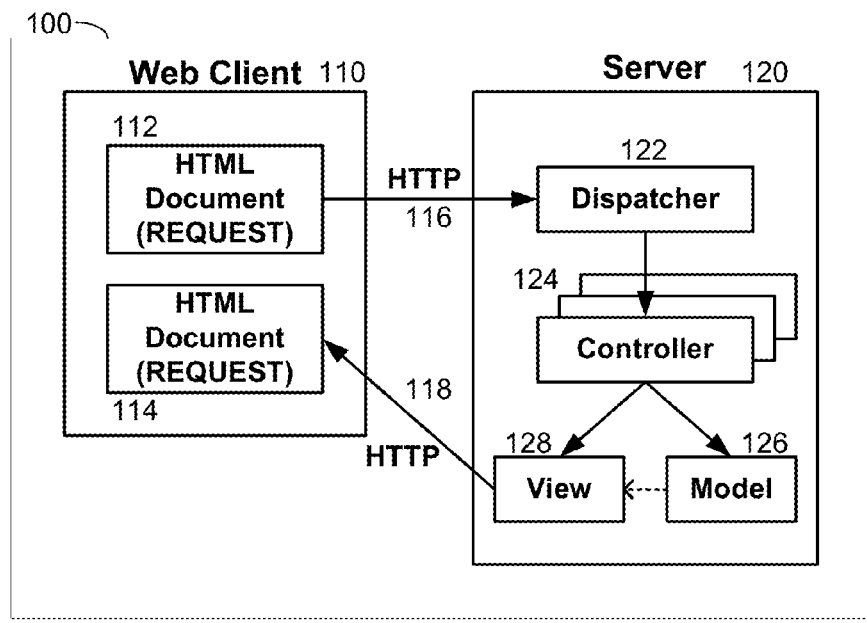
FIG. 1 depicts a diagram illustrating one embodiment of a Model-View-Controller paradigm for implementing Web Services.

Exemplary embodiment(s) of the present invention is described herein in the context of a method, device, and apparatus of particular securing the transmission of data from a Web Page across an Object Oriented software infrastructure and to a relational database, and vice versa.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Specific reference is made in detail to the embodiments of the invention, examples of which are illustrated in the accompanying drawings and following descriptions. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

In the following descriptions the following descriptive names or acronyms will be used;

MVC—Master-View-Controller framework
Ruby—Objected oriented programming language
RoR—Ruby-on-Rails (implements MVC)
RM—Reference Monitor
HTML—HyperText Markup Language
Model—Object to database record mapping
View—Creates HTML web pages.
Controller—Interacts with HTML pages.
Rails—Software MVC written in C & Ruby.
ActiveRecord—Maps Ruby objects to SQL database table records (STI ORM).
MEK—Master Encryption Key
KEK—Key Encrypting Key
MAC—Mandatory Access Control
SQL—Simple Query Language (for querying Relational Databases)
STI—Single Table Instance for ORM
ORM—Object-Relation Mapping
AES—Advanced Encryption Standard
JavaScript—Interpreted programming language found in all Web browsers.
OpenSSL crypto.lib—Popular C library of cryptographic functions.
Schema—Defines database table format.
Counter Mode—A block cipher mode that behaves like a stream cipher.
IDS—Intrusion Detection System
IPS—Intrusion Protection System
PKI—Public Key Infrastructure
VPN—Virtual Private Networking
ACL—Access Control List Referring to FIG. 1, this illustrates a web services software system 100, such as a Ruby-on-Rails (RoR), which is an object oriented framework that marries web pages to back end SQL databases. It uses a classic Model-View-Controller (MVC) paradigm. A Web Client 110 makes HTML document requests 112 using HTTP PUT or POST requests 116 and receives HTML document responses 114 via HTTP responses 118. A Web Application Server 120 receives the HTML document request 112 in its Dispatcher 122 which then chooses the appropriate Controller 124 that then coordinates with the Model 126 and View 128 machinery. The Model sends the View data from its database that is then used to form the HTML response 114 that is sent to the Web browser 110.

The present embodiment of the invention describes how to implement a security system for Web Services based on classic reference monitor and cryptographic techniques that are cost effective, scalable, easy to use, and will allow information sharing in an Internet communications environment.

Figure 2:
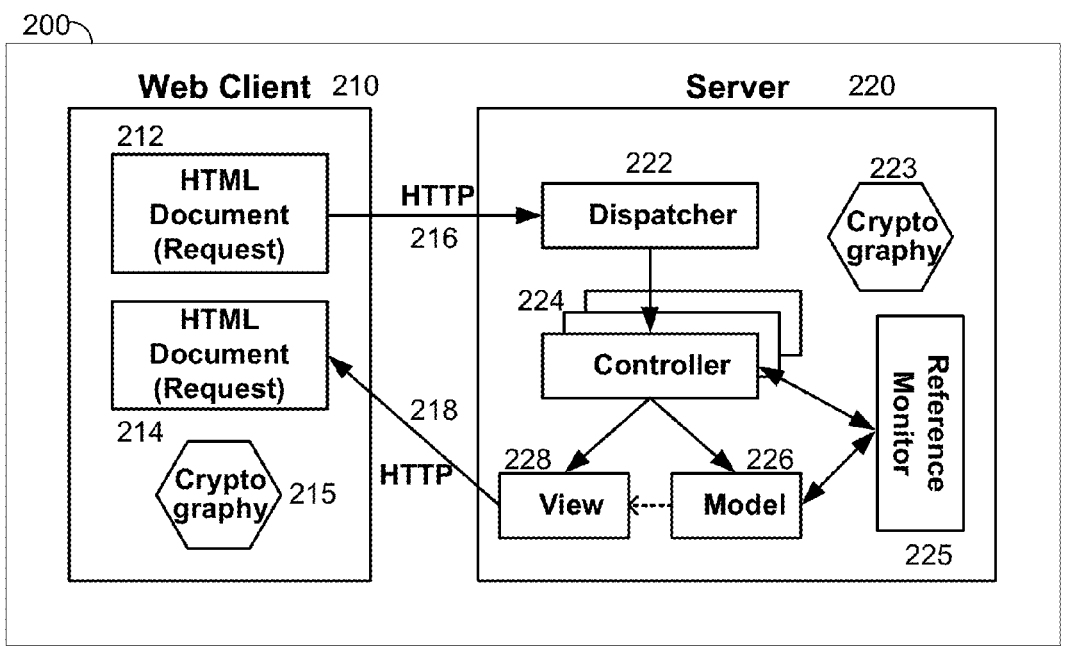
FIG. 2 depicts a diagram illustrating one embodiment of a Model-View-Controller paradigm implementing Web Services with policy and encryption.

Referring to FIG. 2, this illustrates a security system for supporting a web services software system 200, such as RoR, that has all the complexity of user management, data label management, policy adjudication and cryptographic key distribution located inside the trusted Reference Monitor (RM) 225 either collocated with the Web Application Server 220 or in a separate server. The RoR Model 226 and Controller 224 components have secure communications with the RM and it performs only real-time mandatory access control (MAC) policy adjudication. Policy enforcement is achieved using encryption with cryptographic libraries located on the web server 223 and browser 215, the latter can be written in JavaScript. Using an RM reduces the time and cost of the security software development and deployment, and of its security validation and certification.

A Web Client 210 makes HTML document requests 212 using HTTP PUT or POST requests 216 and receives HTML document responses 214 via HTTP responses 218. A Web Application Server 220 receives the HTML document request 212 in its Dispatcher 222 which then chooses the appropriate Controller 224 that then coordinates, after gaining approval from the RM 225, with the Model 226 and View 228 machinery. The Model, with approval from the RM, sends the View data from its database that is then used to form the HTML response 214 that is sent to the Web browser 210.

Figure 3:
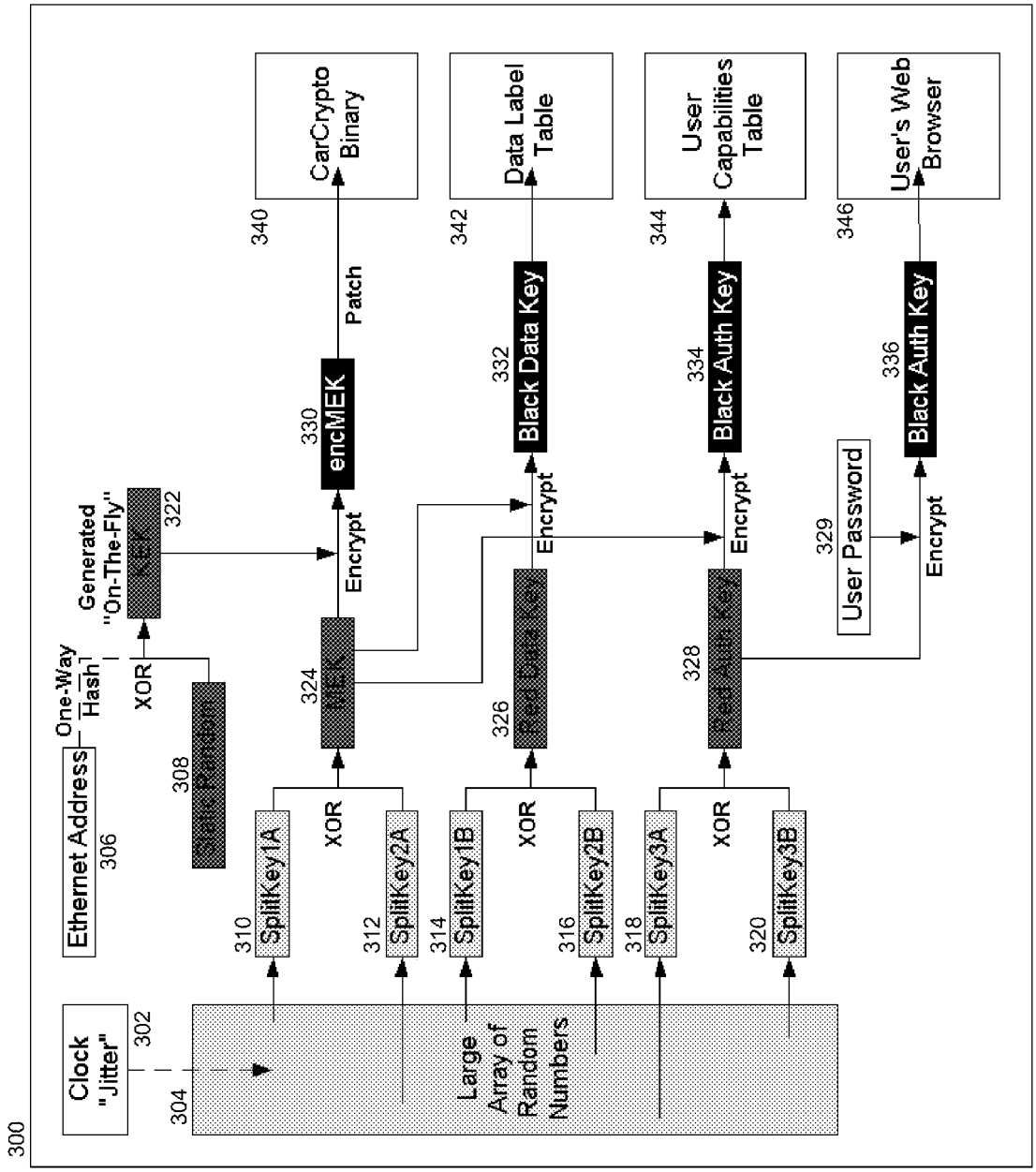
FIG. 3 depicts a diagram illustrating one embodiment of managing cryptographic keys.

Referring to FIG. 3, this illustrates managing cryptographic keys within a security system dependant on cryptography to secure data 300. The security system is designed to concentrate much of the complexity of mandatory access control logic, in particular the policy adjudication portion, in a Reference Monitor. An organization's distributed set of computer systems (users, software programs, devices and data) only have to execute the simpler policy enforcement logic of the server's authorization decisions. This Reference Monitor will contain the software programs that handle user management (enrollment, revocation, etc.), mandatory auditing of all security events, and mandatory access control (MAC) policy adjudication. An organization can then amortize the higher cost of implementing the RM across hundreds, thousands, or tens of thousands of dependent Web Services and computers.

It is vitally critical to manage the life cycle of cryptographic keys. Raw unencrypted keys are referred to as red keys and encrypted keys (under a MEK or KEK) as black (or benign) keys. In military parlance red also means that a security classification or level is associated with it, while black by definition is unclassified.

Most software programmers do not understand how to properly generate, distribute and safeguard cryptographic keys. Only symmetric private keys such as AES keys will be discussed for simplicity. There are several classes of keys; user authentication 328, data privacy 326, and keys that encrypt the other types of keys known as key encrypting keys (KEKs). In this example RoR design we will designate a single KEK as a master encryption key (MEK) 324 that enciphers all the other cryptographic keys within the RoR system. Sometimes there is specialized tamper resistant hardware that can be used to store and protect this key, but often this is not available to most programmers. In a software-only system a KEK 322 is generated "on-the-fly" from some well known hardware identifier, in this example the one-way hash of an Ethernet address 306 associated with the system. The hash digest can be XOR'd with a stored memory static random number 308 to further obfuscate the digest and thus create the temporary KEK. When a hardware RNG is not available to generate good quality random values for the MEK 324, Red Data Keys 326 and Red Authentication Keys 328 then one PRNG technique is to use a large array of random numbers 304, say on a CD-ROM temporarily inserted into the computer system, to generate pairs of split keys (310 & 312, 314 & 316, 318 & 320). Each split key is a strip of random bits the same length as the final key to be generated from a pair of split keys is selected from different locations within the large array of random numbers. One simple technique is to use the lower bits of the computer system's internal clock 302 for a position offset of each split key strip inside the array. The clock usually has some "jitter" when read by a software program due to internal operating system overhead, that makes it difficult to reproduce the exact location. Once two split keys are extracted, from two different locations in the array, then they are XOR'd together to produce the final red key; either MEK, data or authentication. This step effectively makes it impossible to determine the original pair of split keys, thus protecting the original array of random numbers from being determined easily from any compromised red keys. The MEK 324 is then enciphered under the KEK 322 to create an encrypted MEK 330 and this is then patched into the cryptographic library binary 340. Red data keys 326 are enciphered by the MEK to create a black data key 332 that can be stored in a Data Label Table 342. Likewise red authentication keys 328 can be encrypted by the MEK to create black authentication keys 334 that can be stored in a User Capabilities Table 344. Both of these tables are used by the system's Reference Monitor. When a user is enrolled into the system he will receive his red authentication key enciphered under a password 329 to create a black authentication key 336 that can be stored on the User's web browser 346. All black keys can be deciphered by their corresponding MEK or KEK to create red keys, which should only remain in RAM temporarily on an as needed basis. The above description is illustrative only, and can be adjusted appropriately if secure hardware or tokens are available to store red keys. The authentication keys can also be used with asymmetric encryption algorithms, such as RSA keys, however the key generation will be more complex, involving selecting relative primes for example. Data keys normally are used only with symmetric encryption algorithms such as AES or DES.

Referring to FIG. 4, this example C code, a function getKEK( ) 400, illustrates generating the Key-Encrypting Key (KEK) from the Linux "eth0" Ethernet address. To protect the MEK from being exposed too easily we re-encipher it with another, more transient key, a KEK that we derive on-the-fly from the web server's primary NIC Ethernet address 402. While this is not perfect, it does make it more difficult for an insider attack, because if he steals or copies the web server's disk he cannot easily decrypt the encrypted MEK by simply booting it up on a new computer—the Ethernet address will be wrong. He could steal the old Ethernet address too, but this is the well-kept secret of the system that should be guarded carefully. Note that the Ethernet address is just an example, other unique hardware identifiers could be used, or when the system reboots a trusted administrator types in a password that creates the KEK. In this example the Ethernet address is hashed 404 into a final SHA-1 digest 406. This digest is then XOR'd with a static random number 410 and copied into the KEK memory location in RAM 412.

To avoid burdening the programmer with the need to understand how KEK, MEK and the encrypted data and authentication keys work together, most of the complexity is buried inside of a Ruby class (i.e. CarCrypto) that does all the cryptography and automates much of the key management.

Referring to FIG. 5, this sample C code illustrates generating the MEK 500, enciphering it and patching it into a software library. At installation time, the MEK is encrypted under the KEK 512, which is generated "on-the-fly" 502, and patched into the software representing the Ruby cryptographic class 516 that will be used by the RoR system to encrypt and decrypt data.

In a software only environment like RoR we do not have the luxury of being able to create any amount of high quality random bit sequences that are necessary for making cryptographic keys, which are simply short sequences of random bits (usually 128 or 256 bits long). Random bit sequences can only be generated off of the Universe's fundamental physical properties, via either sampling electron thermal "noise" or some other quantum mechanical source. So the simplest approach is to generate a large array of random numbers offline before generating the keys. Then during installation and periodically afterwards a basic technique can be used to create very high quality random bit sequences to be used for cryptographic keys. Select two offsets inside the large array of random numbers and pull out two split keys. They should not overlap each other. One method is to use the computer's local clock, say the number of seconds since Jan. 1, 1980, and use its lower, frequently changing digits as an offset to the first split key 504. Wait 15 seconds 506, then sample the clock again and get the second split key offset 508. There will be some random jitter or drift between the two clock readings so that it would difficult to recreate these offsets perfectly at a later date. Then XOR the two split keys together to form the actual red cryptographic key 510. Except for the transient KEK key, all our keys are formed in this manner; MEK, authentication and data keys. After installation the large array of random numbers can be thrown away, or if keys need to be generated periodically it can be kept for a period of time and then replaced occasionally with a fresh array of random byte values.

Referring to FIG. 6, this sample C code 600, a function called Init_CarCrypto, illustrates defining an interface between a cryptographic module written in C code and a Ruby Class that is called CarCrypto 602. The C code calls the OpenSSL crypto.lib API and has the encrypted MEK patched inside it. Various CarCrypto methods are defined in this C function; to generate a black data key 604, to retrieve a red data key 606 from a black data key, to generate a black authentication key 608, to encrypt data with a black data key 610 and to decrypt data with a black data key 612.

Referring to FIG. 7, this sample pseudo-Ruby code illustrates how the CarCrypto C code interfaces with the Ruby-on-Rails environment (see FIG. 6) with this implicit CarCrypto Ruby Class definition 700. Various CarCrypto Ruby methods are available; to generate a black data key 704, to retrieve a red data key 706 from a black data key, to generate a black authentication key 708, to encrypt data with a black data key 710 and to decrypt data with a black data key 712. For example Ruby code to generate a black data key can be written as CarCrypto.generateBlackDataKey( ).

Referring to FIG. 8, this sample C code 800 illustrates an example of the CarCrypto.encryptData method written in C and exported into Ruby-on-Rails. It generates the KEK "on-the-fly" 804 and uses it to decrypt the black MEK key 802 that in turn decrypts the black data key before finally encrypting the clear text data 804. The red data key is used to encrypt the clear text data 806. The cipher text data is returned to the caller of the method 808.

Referring to FIG. 8, this sample C code 800 illustrates an example of the CarCrypto.encryptData method written in C and exported into Ruby-on-Rails. It generates the KEK "on-the-fly" 804 and uses it to decrypt the black MEK key 802 that in turn decrypts the black data key 806 before finally encrypting the clear text data. The red data key is used to encrypt the clear text data 808. The cipher text data is returned to the caller of the method 810.

Figure 9:
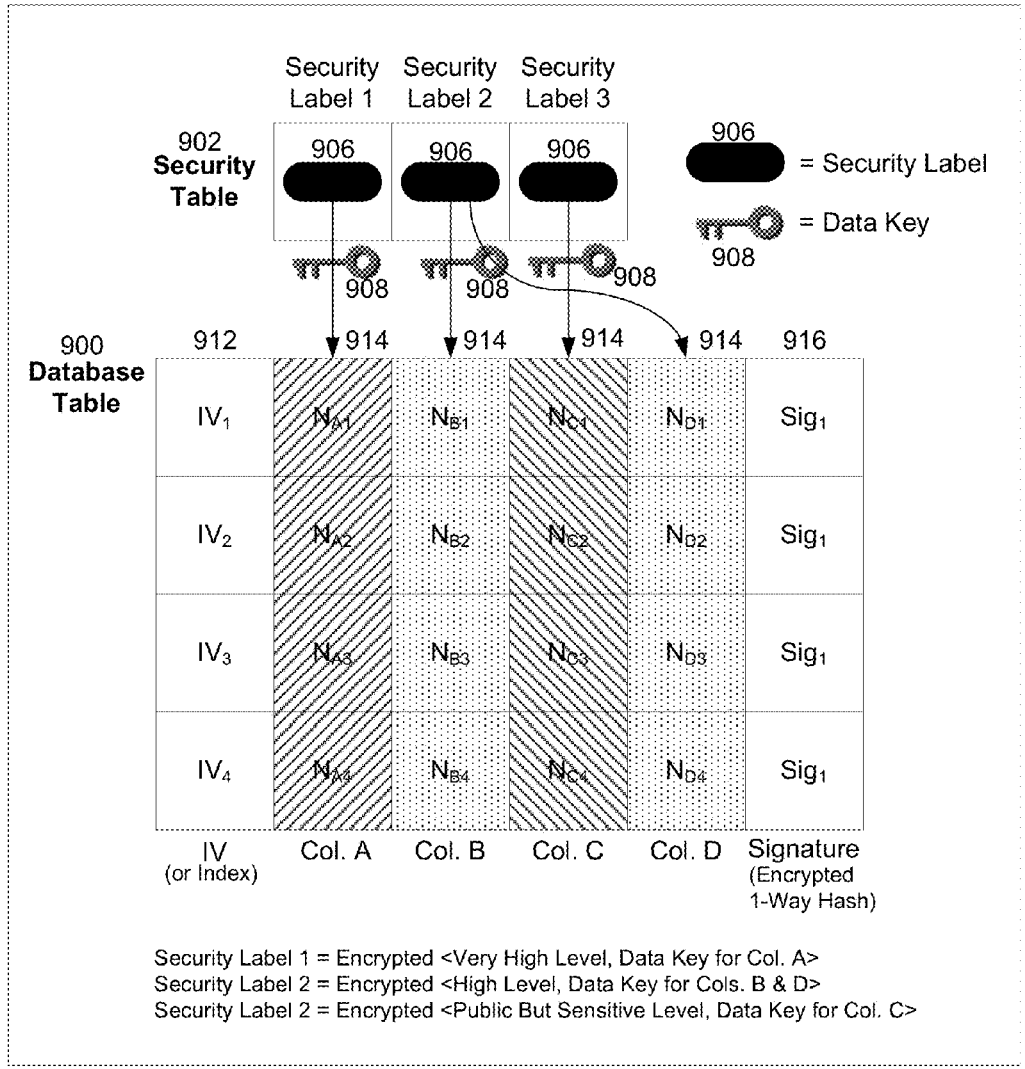
FIG. 9 depicts a diagram illustrating one embodiment of managing Labels and Data Keys for encrypted database table columns.

Referring to FIG. 9, this illustrates managing Keys and Labels for Database Table Columns 900. Within a database table 904, each table column 914 is associated with a security label 906 (e.g. access control attributes with a data key). Each column 914 is encrypted, and each column's security domain has access control attributes and a black data key 908 associated with it inside a separate security table 902. When a Ruby-on-Rails (RoR) Controller (on behalf of a User) wants to access an encrypted column 914, the RoR Model sends a column's access control attributes and black data key 908 from the security table, along with the User's capabilities, to the Reference Monitor (RM). The RM adjudicates the User's capabilities versus the Column's access control attributes and if MAC policy passes then it gives the RoR Model the column's red data key 910. The RoR Model can then decrypt (or encrypt) a column's fields. As described later in FIG. 10, the initialization vector (IV) 912 is used to help decrypt or encrypt each field within the column. Also each row within the database table can have a one-way cryptographic hash applied across its fields to prevent integrity tampering. This hash is also enciphered under a data key and it is stored in a separate table signature column 916. If a column field within a record is updated and reenciphered then the corresponding row's record signature would have to be recomputed, enciphered, and updated also (likewise the corresponding IV within that row's record will have to be changed for cryptographic reasons described in FIG. 10).

Figure 10:
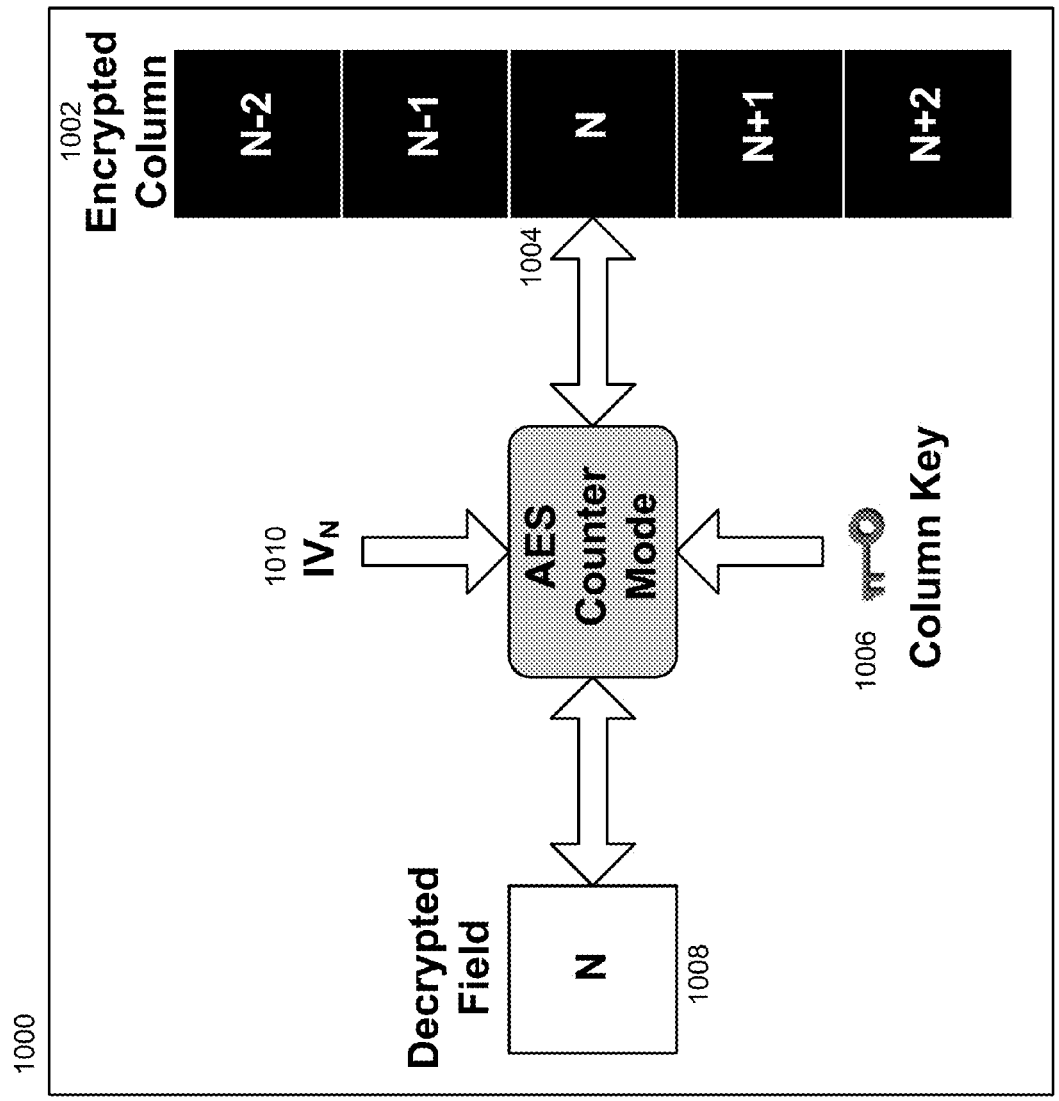
FIG. 10 depicts a diagram illustrating one embodiment of random-access database table column encryption or decryption.

Referring to FIG. 10, this illustrates Random-Access Database Column Encryption 1000. The database enciphered column's 1002 encryption and decryption uses AES in Counter mode 1006. The IV 1010 of the mode can come from the record index of the ciphertext field 1004 that is to be decrypted (or cleartext field 1008 to be encrypted) within the encrypted column under a red data key 1006. This allows random access and decryption of any enciphered field within the encrypted column. Column fields can be any fixed length since the AES Counter mode preserves field sizes within a record when transforming between cleartext and ciphertext. Great care needs to be taken to ensure that the IVs are not generating overlapping pads between neighboring fields within the column, and when a field is re-encrypted with changed data that the IV is changed too (this will either require a new record index value or a separate column to store IV values that are decoupled from the record index values). Also, because columns can have structured cleartext data types associated with them, like ASCII text or a date format, then the ciphertext column will either have to maintain the data type through a substitution mechanism (the enciphered column will look like random ASCII text or random dates) or via a transformation mechanism that allows the database to treat the binary ciphertext column as a structured clear text column.

Figure 11:
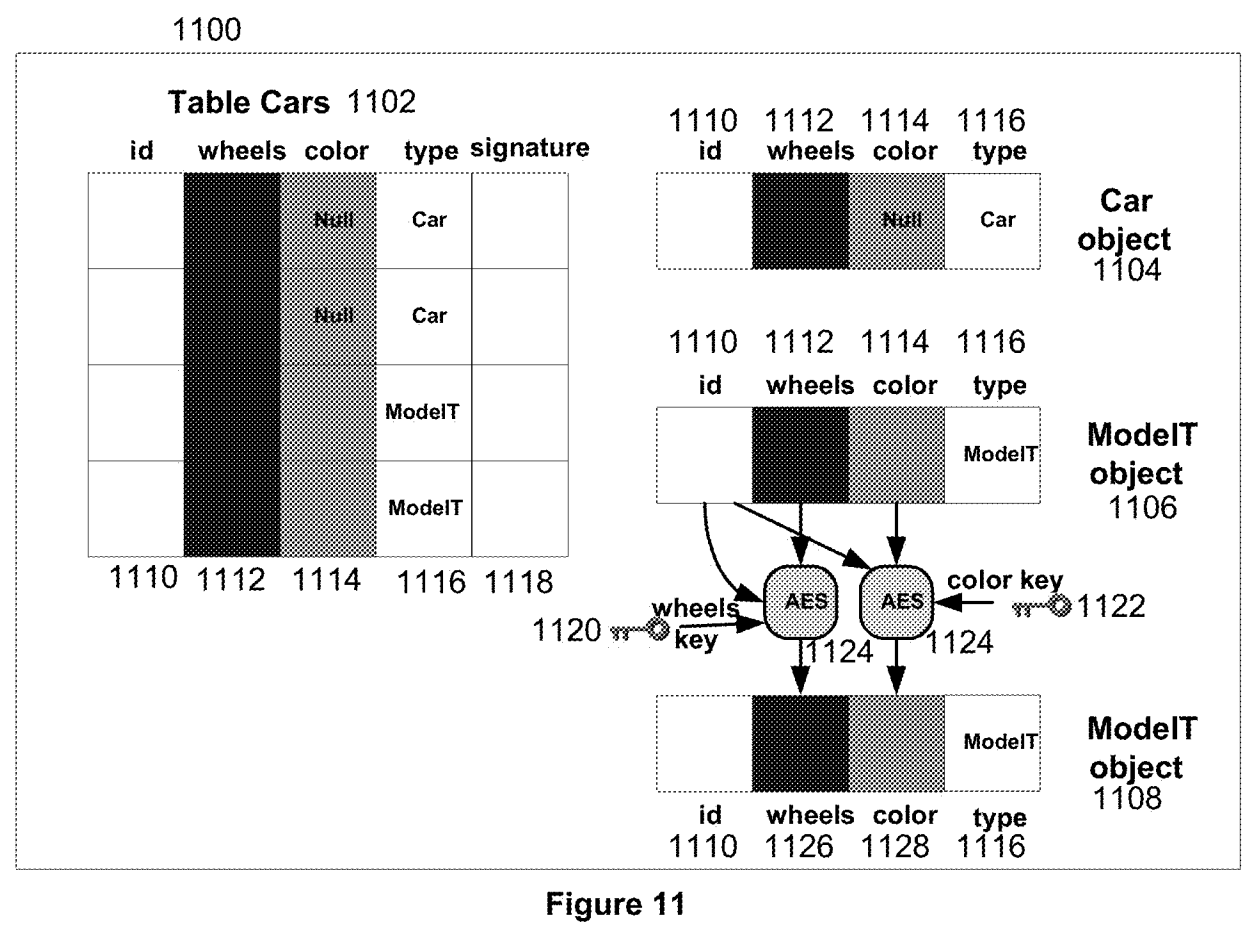

Referring to FIG. 11, this illustrates 1100, as an example, how the Ruby-on-Rails Model component is used to automate an object-to-relational mapping between Ruby ActiveRecord objects and records in a relational database table using the Single Table Instance pattern (STI). In this pattern individual records are mapped to dynamic memory objects and a table can support a class hierarchy of objects.

In this example furthermore, a table called Cars 1102, with Car 1104 and ModelT 1106 records/objects, which has two columns encrypted under separate data keys, an id column 1110, Ruby Class type column 1116, and a record Signature column 1118. The wheels column 1112 is shared by both types of records/objects, but only the color column 1114 is used by the ModelT record/object, which is an instance of the ModelT class that is derived from the Car class.

And in this example furthermore, an enciphered ModelT record/object 1106 has its two ciphertext data fields, wheels 1112 and color 1114, decrypted into corresponding deciphered ModelT record/object 1108 with its two cleartext data fields, wheels 1126 and color 1128. The AES cipher in Counter mode 1124 uses the wheels red data key 1120 and the id field 1110 for the IV to decipher the wheels ciphertext field 1112, and it uses the color red data key 1122 and the id field 1110 for the IV to decipher the color ciphertext field 1114.

Referring to FIG. 12, these Ruby and SQL codes illustrate supporting RoR's ActiveRecord with the Security Table. These are examples of Ruby-on-Rails code of the ActiveRecord class hierarchy for the Car 1202 and ModelT 1204 classes. The ModelT is a class inheritance from Car. CarKey 1206 is the security class associated with the Car class (and also the ModelT class) for assigning a key and access control attribute per table column. These are the SQL schema declarations for the data table cars 1208 and it's affiliated security table car_keys 1210 that ActiveRecord uses to automatically generate the Car and CarKey Ruby-on-Rails class declarations.

Referring to FIG. 13, this illustrates a pseudo-class definition of a Reference Monitor, the ReferenceMonitor Class 1300. It is a tamperproof, always-invoked and small enough to be full-tested and analyzed module that controls all software access to data objects inside of the Web Services system. It verifies the nature of a user's data request against a table of allowable access capabilities for each user on the system. To support policy adjudication and enforcement (via encryption) in the RoR MVC Framework, both the Controller and Model communicate with the RM.

Enrolling and revoking users are not discussed in detail. The enroll_user method 1302 adds a new user to the user_capabilities table 1406 and returns a user id and black authentication key, which is encrypted under the user's password, and the revoke_user method 1304 sets the revoked variable to true in the user record. A secure data label is a simple <id, black key, level> tuple and is used by the create_label 1308 and break_label 1310 methods. The create_label method returns a data label object with a new black data key inside it or nil. The break_label method returns either the red data key or nil. The private method authenticate_user 1306 returns a user object or nil.

Referring to FIG. 14, this illustrates the User and Data Attribute Classes. These are the security attributes classes that support user capabilities and data labels (e.g. ACLs and data keys). Both the encrypted authentication and data keys are stored in ActiveRecord Classes/tables that are used by the ReferenceMonitor Class 1300; respectively the UserCapabilities Class 1402 and the DataLabel Class 1404. And their corresponding table schema declarations are; the user_capabilities table 1406 and the data_labels table 1408.

Referring to FIG. 15, this illustrates a user authentication method, authenticate_user 1500. This private method is called internally every time one of the public methods of the ReferenceMonitor Class 1300 is called. It shows how to support real-time revocation of a user by checking the user.revoked attribute 1504. The user's black authentication key is from the UserCapabilities Class. This illustrative example Ruby code uses a simple credential, just the user_id encrypted with the user's authentication key (user.black_key) 1506. When the credential is decrypted it should equal the user_id 1508. If the user_id and credential are authenticated then a user object is returned 1510.

Referring to FIG. 16, this illustrates a class method for creating a security data label, create_label 1600. This ReferenceMonitor Class 1300 method creates a data label for a new piece of data. The illustrative example Ruby code shows that the user_id is authenticated first 1602, then the user capability is compared against the data level (real-time mandatory access control (MAC)) 1606, and if this passes then the data label object is created 1608, and returned 1616, with the newly generated black data key 1610 & 1612 (enciphered under the MEK) and passed in data level 1614.

Referring to FIG. 17, this illustrates a class method for breaking a security data label, break_label 1700. This ReferenceMonitor Class 1300 method breaks an old data label for an existing piece of data. The illustrative example Ruby code shows that the user_id is authenticated first 1702, then the user level is compared against the data level (in the old data label, this is again a real-time MAC) 1706, and if this passes then the black data key (enciphered under the MEK) is returned 1708.

Referring to FIG. 18, this illustrates an example Model class 1800, the Car Class 1801, showing how the object-to-record mapping automates the encryption and decryption of object attributes to record column fields. The has_many tells us that multiple records in the car_keys table are affiliated with each record in the cars table 1808. The after_initialize method 1802 is automatically called whenever a Car object is loaded from the cars table and it will decrypt the wheels attribute with the column key 1814 (assuming the policy adjudication in breakLabel succeeds 1812). The before_save method 1804 is automatically called whenever a Car object is saved to the cars table and it will automatically encrypt the wheels attribute with the column key 1822 (assuming the policy adjudication in breakLabel succeeds 1820).

Referring to FIG. 19, this illustrates an example Controller class 1900, the CarController Class 1920, that will take a random Car object 1924 that has had its wheel attribute automatically decrypted by Car Class 1814 and re-encrypt it with the user's Authentication key 1928. Before this happens a check is made inside the check_authentication method 1902 to see if the user is authenticated or not. (We never send the password to the web server; it is only used on the web browser to decrypt the authentication key. Then the key is used to authenticate the user. This is an illustrative example of two-factor user authentication). If the user_id is active then we get the UserCapability object that contains the user's black authentication key stored in the user_capabilities table 1916 & 1926.

Referring to FIG. 20, this illustrates an example View that leverages JavaScript inside of the HTML page 2000. The JavaScript includes a library called jscrypt.js that contains AES and other cryptographic algorithms 2002. At a high level it shows how the user's password is used to decrypt the stored authentication key 2006 & 2008 & 2010 & 2012. This key is then used to decrypt the car_obj.wheels data element and print out the cleartext value 2014 & 2016 & 2018. In contrast the car_obj.id is already cleartext 2004. The reverse process can take place with an HTML request by encrypting cleartext data elements on the Web browser and decrypting the resulting ciphertext data elements at the web server after the resulting ciphertext data elements arrive at the server. Note that individual data elements can be encrypted within the web page and this is not dependent on using SSL.

Policy is enforced by the Model 1800, so that the Controller 1900 and the View 2000 are simply protecting data in transit.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method, comprising:
   generating a database relational table having multiple encrypted column attributes and multiple records, wherein generating the database relational table occurs within a database in a server;
   generating a security table having multiple records, each record of the security table including a mandatory access control ("MAC") policy field, a black data key field and a column identifier field, wherein generating the security table occurs within a reference monitor server ("RM");
   generating a user capabilities table having multiple records, each record of the user capabilities table including an MAC policy field, a black authentication key field, and a user identifier field, wherein generating the user capabilities table occurs within the RM;
   generating a red key-encrypting key ("KEK"), a red master encrypting key ("MEK"), multiple red data keys, and multiple red authentication keys;
   enciphering the red data keys and the multiple red authentication keys with the red MEK to produce black data keys and multiple black authentication keys;

enciphering the red MEK with the red KEK to produce a black MEK;

storing MAC policies, the black data keys, and column identifiers in a plurality of RM security table records, wherein corresponding red data keys are used to encipher or decipher multiple ciphertext column attributes of multiple records in the database relational table and storing corresponding multiple objects' cleartext data members in a memory;

storing MAC policies, the multiple black authentication keys, and user identifiers within a plurality of user capabilities table records, wherein corresponding red authentication keys are used to decipher user credentials;

storing the black MEK in a computer file, wherein a corresponding red MEK is deciphered by the red KEK and stored in a computer memory location;

authenticating a user identifier, wherein a user's credential is decrypted by a red authentication key associated with the user identifier and validated; and mapping multiple cleartext objects of object-oriented programming memory locations to multiple database records containing ciphertext fields, wherein decryption of the black data keys and access to the corresponding red data keys are adjudicated by the RM in accordance with MAC policy and user's MAC policy.

2. The method of claim 1, wherein generating the database relational table further includes an extra attribute capable of storing a unique number or initialization vector (IV) used by a block cipher for a mode that produces a stream cipher.

3. The method of claim 2, wherein the block cipher uses a cryptographic key and the unique number or IV to produce a stream cipher that allows random access decryption or encryption of any record attribute.

4. The method of claim 3, wherein the block cipher mode is a counter mode that produces any portion of a key pad necessary to encrypt or decrypt a record's attribute.

5. The method of claim 1, wherein generating the database relation table further includes an extra attribute capable of storing an encrypted one-way hash (digest) or cryptographic signature providing cryptographic integrity for a corresponding record.

6. The method of claim 1, wherein generating the database relational table further includes a relation having multiple attributes for storing the multiple encrypted attributes encrypted by the multiple red data keys.

7. The method of claim 1, wherein each object corresponds directly to a contiguous block of computer memory of a specific size at a specific location.

8. The method of claim 7, wherein each object has data members that represent data associated with the object; and wherein each object is configured to access the data members in predefined ways.

9. The method of claim 8, wherein each object's data members are persistent and are mapped to one or more attributes within one or more records from one or more relations;

and each object has one or more methods that dynamically decrypt one or more attributes when read from one or more records in one or more relations;

and each object has one or more methods that dynamically encrypt one or more attributes when written to one or more records in one or more relations.

10. The method of claim 8, wherein an instance of a program is treated as a dynamic set of interacting objects.

11. The method of claim 10, wherein the program is part of a web service that includes clients and servers that communicate over the Hypertext Transfer Protocol used on the Internet.

12. The method of claim 11, wherein the web service is a Model-view-controller (MVC) architectural pattern used in software engineering.

13. The method of claim 12, wherein the web service is Ruby-on-Rails.

14. The method of claim 8, wherein the object is an instance of its class;

and a class inherits attributes from another class or classes.

15. A networking system, comprising:

a memory;

a processor;

a web client able to connect to Internet and configured to access online data; and a server coupled to the web client via the Internet and configured to provide secure data, wherein the server includes, a database relational table having multiple encrypted column attributes and multiple records, wherein generating the database relational table occurs within a database in the server, a reference monitor server ("RM") able to generate a security table and a user capabilities table, wherein the security table having multiple records, each record of the security table includes a mandatory access control ("MAC") policy field, a black data key field and a column identifier field, wherein the user capabilities table includes multiple records, each record of the user capabilities table including an MAC policy field, a black authentication key field, and a user identifier field, wherein the server includes a red key-encrypting key ("KEK"), a red master encrypting key ("MEK"), multiple red data keys, and multiple red authentication keys, wherein the server is configured to perform enciphering the red data keys and the multiple red authentication keys with the red MEK to produce black data keys and multiple black authentication keys and enciphering the red MEK with the red KEK to produce a black MEK.

16. The system of claim 15, wherein the server stores MAC policies, the black data keys, and column identifiers in a plurality of RM security table records, wherein corresponding red data keys are used to encipher or decipher multiple ciphertext column attributes of multiple records in the database relational table and storing corresponding multiple objects' cleartext data members in a memory.

17. The system of claim 16, wherein the server stores MAC policies, the multiple black authentication keys, and user identifiers within a plurality of user capabilities table records, wherein corresponding red authentication keys are used to decipher user credentials.

18. The system of claim 17, wherein the server stores the black MEK in a computer file, wherein a corresponding red MEK is deciphered by the red KEK and stored in a computer memory location.

19. The system of claim 18, wherein the server authenticates a user identifier, wherein a user's credential is decrypted by a red authentication key associated with the user identifier and validated.

20. The system of claim 19, wherein the server maps multiple cleartext objects of object-oriented programming memory locations to multiple database records containing ciphertext fields, wherein decryption of the black data keys and access to the corresponding red data keys are adjudicated by the RM in accordance with MAC policy and user's MAC policy.

* * * * *